Feb. 14, 1950  B. BERKMAN  2,497,532
MILKWEED GIN
Original Filed May 15, 1942  4 Sheets-Sheet 1

Inventor.
Boris Berkman
By Williams, Bradbury,
and Hinkle Attys.

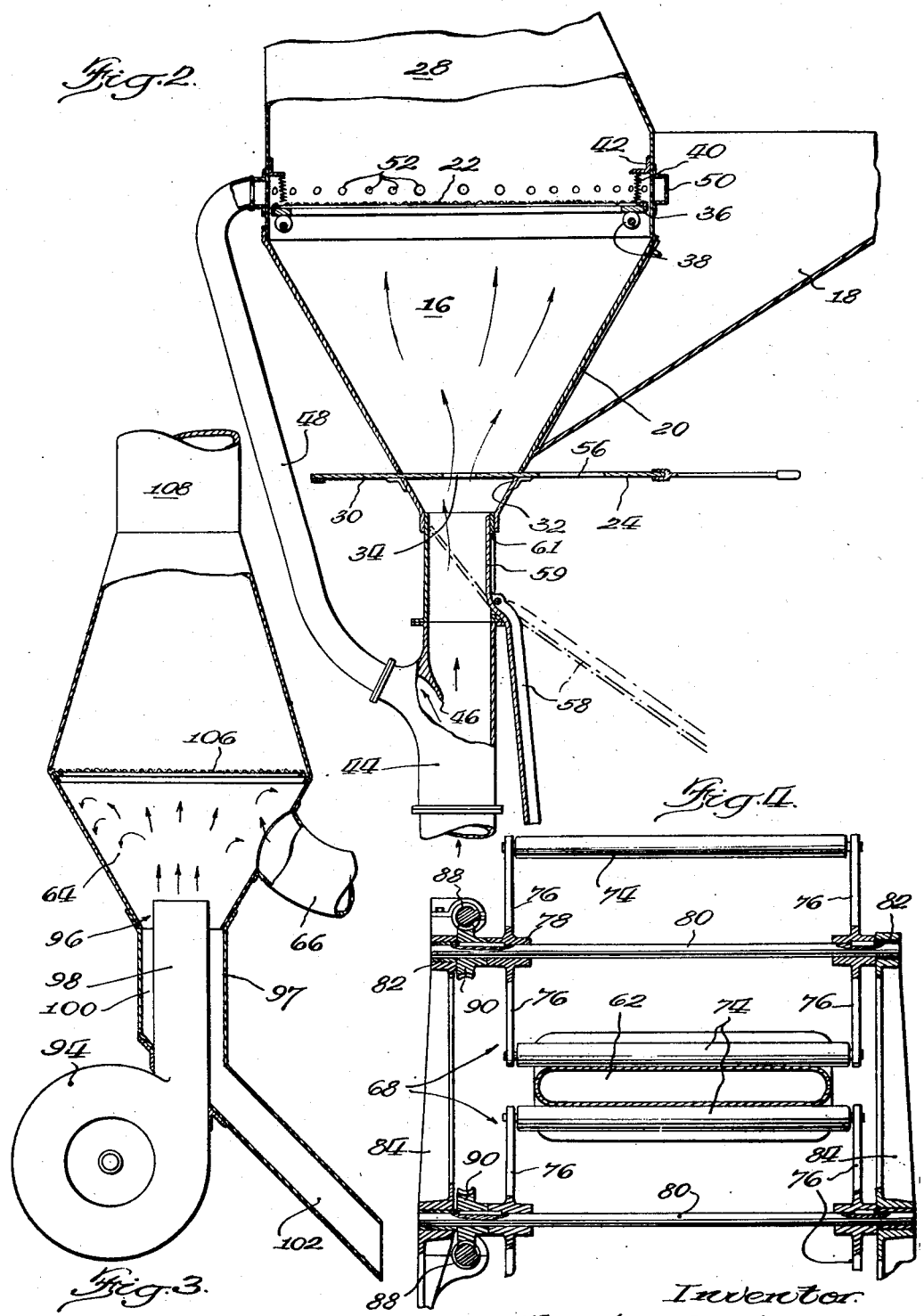

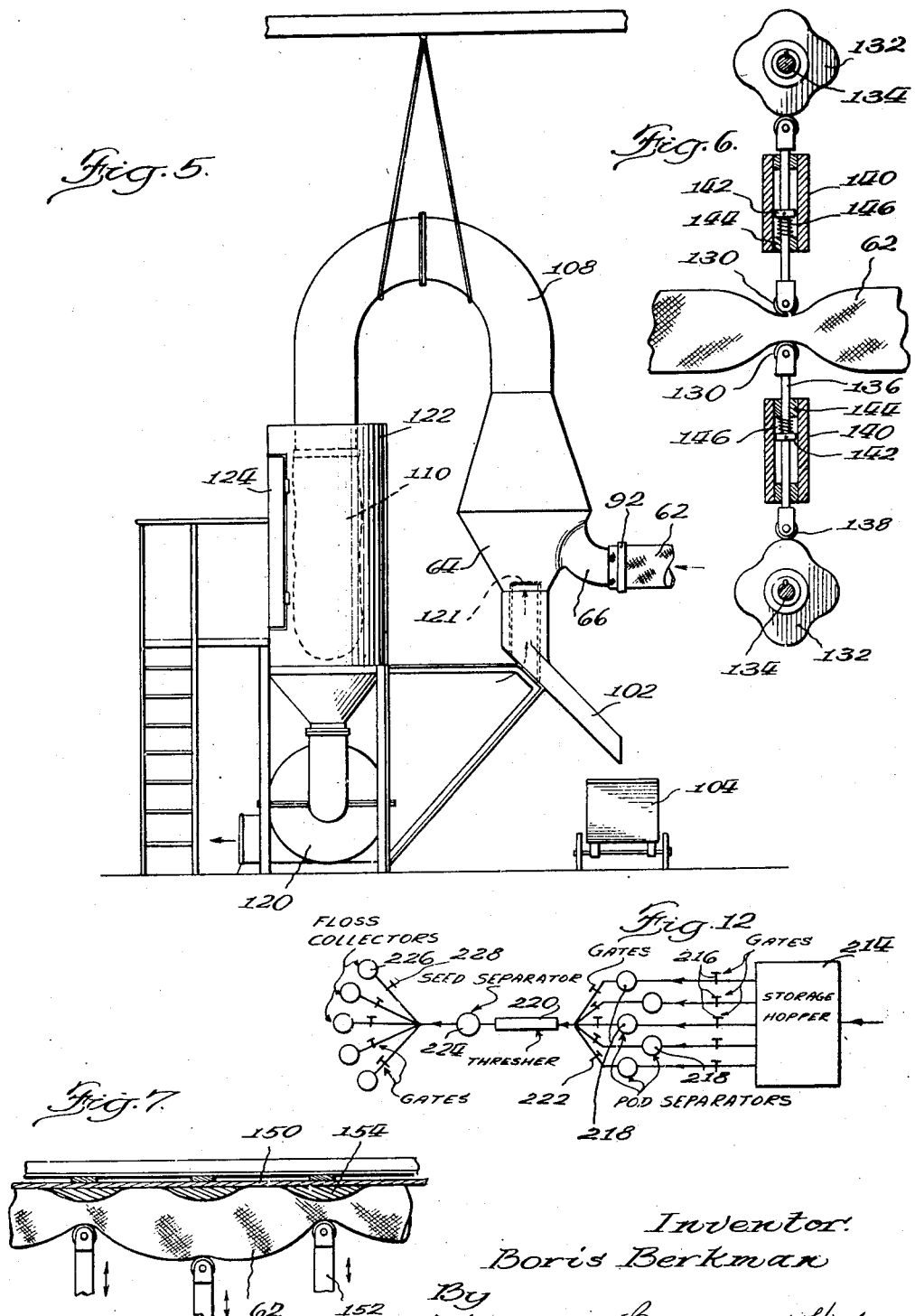

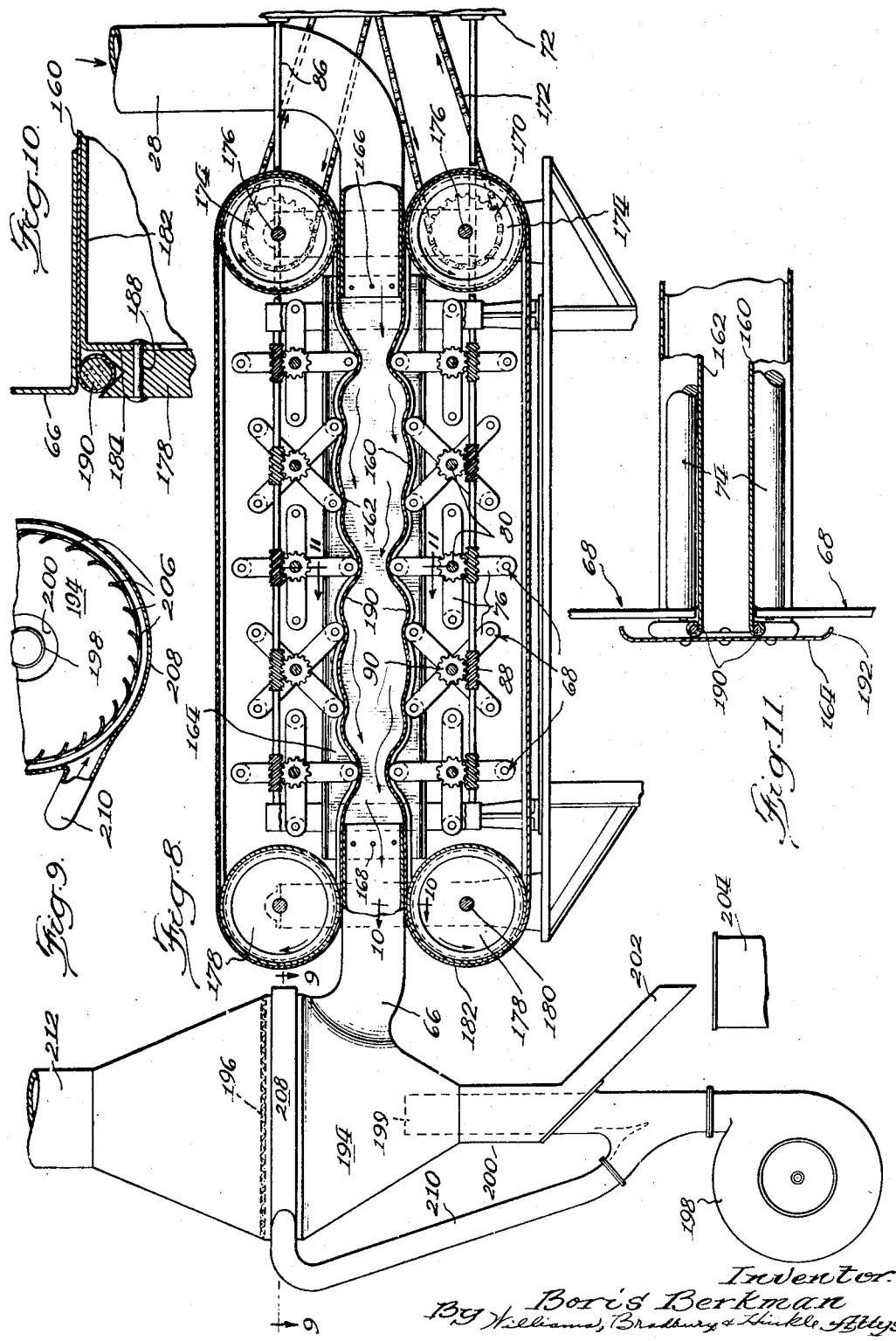

Patented Feb. 14, 1950

2,497,532

UNITED STATES PATENT OFFICE 2,497,532

MILKWEED GIN

Boris Berkman, Appleton, Wis., assignor to Milkweed Products Development Corporation, Chicago, Ill., a corporation of Illinois Original application May 15, 1942, Serial No. 443,086, now Patent No. 2,362,965, dated November 21, 1944. Divided and this application December 2, 1943, Serial No. 512,519

6 Claims. (Cl. 19—39)

My present invention relates to a milkweed gin for separating the component parts of the milkweed plant, and is a division of my copending application Serial No. 443,086 filed May 15, 1942, Patent No. 2,362,965 granted November 21, 1944.

The common milkweed is a hardy perennial plant, three to seven feet tall, having hollow woody stalks nourished by an extensive root system. The stalks bear from five to thirty-five pods each which mature in the autumn in most parts of the United States.

Each milkweed pod contains a multitude of seeds by which the plant reproduces itself. Each individual seed is fitted with a group of seed hairs, forming a "parachute," which because of its voluminous lightness, is caught by the breeze as the enclosing pod bursts, and is carried far from the plant. It is by this method that the milkweed plant scatters and spreads.

By much experimentation and research, I have found valuable uses to which the many parts of the milkweed plant may be put, and a study of the plant and its habits has given the clue to a successful method of separating the milkweed floss and seeds from the pods and from each other.

The method of liberating the valuable floss from the seeds and pods is an object of my invention. The method is accomplished in two steps: the separation of the floss and seeds from the pods; and the liberation of the floss from the seeds.

Another object of my invention is to provide apparatus for separating the floss and seeds from the pod and from each other.

Another object of my invention is the provision of means for treating pre-cured milkweed pods to effect separation of floss and seeds from the pods and from each other.

Another object of my invention is the provision of a means for the separation of pods, floss and seeds without the necessity of curing the pods to control their moisture content to 20 to 30 per cent. as has been heretofore necessary.

Another object of my invention is to provide means for collecting air-borne milkweed floss.

Another object of my invention is the provision of means for separating the floss from the seeds wherein no moving parts came in contact with the floss to injure or break these delicate fibers.

Further objects and advantages will become apparent from the following description when read in conjunction with the drawings in which:

Fig. 2 is an enlarged sectional view of the pod separation and agitation chamber;

Fig. 3 is an enlarged sectional view of the floss and seed separation chamber;

Fig. 4 is an enlarged sectional view taken on the lines 4—4 of Fig. 1, looking in the direction of the arrows showing the details of construction of the rotary beaters;

Fig. 5 is a partial elevational view of the apparatus of Fig. 1 showing an alternative form of the floss collector;

Fig. 6 is an enlarged partially sectional view of a modified form of the beaters;

Fig. 7 is an enlarged view of a part of the threshing tube showing still another modification of the beating apparatus;

Fig. 8 is a partially sectional view of a modification of the threshing mechanism and the air flotation chamber;

Fig. 9 is a sectional view of the modified air flotation chamber taken on the line 9—9 of Fig. 8 and looking in the direction of the arrows;

Fig. 10 is a sectional view taken on the lines 10—10 of Fig. 8 showing the details of the conveyor drive;

Fig. 11 is a sectional view taken on the lines 11—11 of Fig. 8; and

Fig. 12 is a flow chart illustrating how the apparatus may be adapted to the principles of continuous and mass production.

Figure 1:
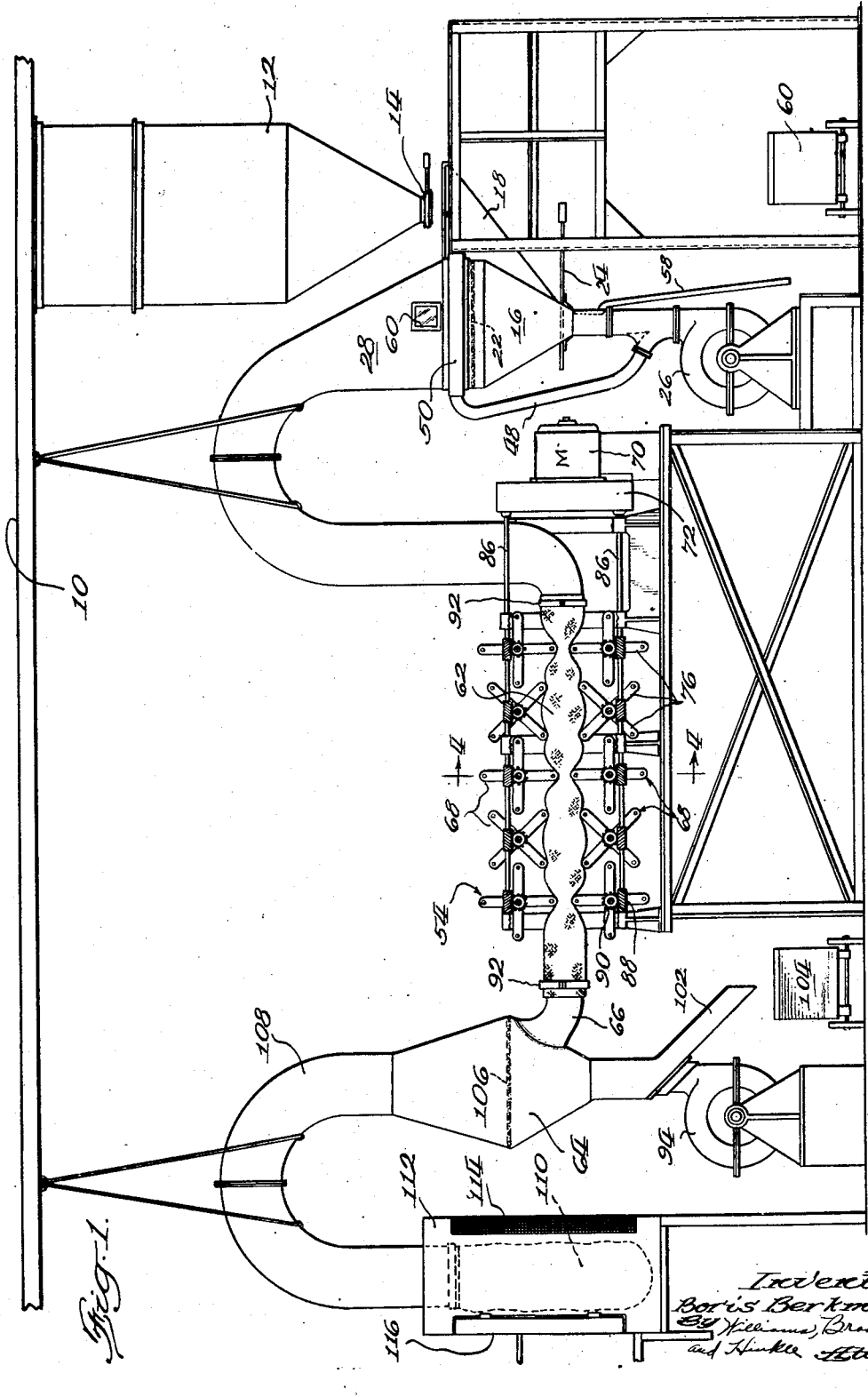
Fig. 1 is an elevational view of the apparatus used in carrying out the separation and collection of milkweed pods, seeds, and floss.

It has been found that the separation of the milkweed pods, floss, and seeds is best accomplished when the moisture content of the pods has been reduced to 20 to 30 per cent. by weight by a drying out process. The drying out process permits the pods to burst open readily and permits the separation of the floss from the seeds to be completed without difficulty.

This carefully controlled drying out process cannot be completed in the fields or on the site where the milkweed is grown, because the pods would open at least partially and much floss and seeds would be carried away by the wind. The pods had to be brought to the gin or drying house where the final curing was done.

The curing or drying out process had to be carefully controlled so that the critical moisture point could be obtained. The process was necessarily time taking, and as the pods had to be spread out in racks, it was also space consuming. It was found that the drying out could be speeded up by passing heated dry air over the pods. But this has a deleterious effect upon the seed germination reducing it as much as 20 per cent.

If the apparatus of this invention is used, the final drying out or curing may be dispensed with, and the pods are merely pre-dried sufficiently to prevent molding. The moisture content is no longer critical and the pods, floss, and seeds may be separated readily even though this moisture content be as high as 40 to 45 per cent. by weight.

Fig. 1 of the drawings shows the entire apparatus of this invention. When the pods are removed from their stalks and received from the growers in pre-dried condition they are spread out in the storeroom 10. Leading from the storeroom is a large hopper 12 at the bottom of which is a control gate 14. The hopper 12 supplies pods to the agitation chamber 16 through the smaller feed hopper 18. The chamber 16 is connected to the hopper 18 through gate 20. The chamber 16 is covered by a grate 22 at the top and a control valve 24 is placed at the bottom. As shown in Figs. 1 and 2, it has been found that an inverted conical or pyramidal shape is best adapted to the purposes of this invention, although other shapes may be used to considerable advantage.

A blower 26 of any standard type blows an air stream through the chamber 16 from the bottom and into duct 28 at the top of chamber 16. In operation the small hopper 18 is filled from hopper 12, the hopper 18 being of such a size that it will measure the proper amount of pods which can be handled at any one time in the agitation chamber 16. A valve 24 is placed between blower 26 and chamber 16 and adjusted so that the solid area 30 covers the inlet 32 to the bottom of chamber 16; gate 20 is opened and the hopper 18 empties its contents into the chamber 16. The blower 26 is started and the valve 24 is opened so that the small opening 34 registers with opening 32. The size of the opening is sufficiently small so that the air stream directed into the chamber is similar to that emanating from a nozzle.

The pods are violently agitated and are knocked against the grate 22, each other, and the walls of the chamber 16 by the air stream. This agitation is of a character calculated to burst open the pods and to shake loose their content of floss and seeds. The floss and seeds thus freed are blown from the chamber 16 through the grate 22 and into the duct 28. The openings in the grate 22 are large enough to pass the seeds and floss but are small enough to retain the empty pods in the agitation chamber.

In order to prevent the pods from clinging to the grate 22 and sticking in its interstices I provide mechanism for vibrating the grate. The grate 22 is mounted on a strip 36 or is made integrally with the strip 36 which extends around its periphery. This strip rests upon at least two eccentrically mounted cams 38. Springs 40 disposed between the grate 22 and angles 42 mounted on the walls of the duct maintain the grate 22 in contact with the cams 38. During the agitation of the pods the cams 38 are driven by a motor or other means not shown to give the grate 22 an up and down vibratory motion. This vibratory motion has the effect of keeping the grate 22 relatively free from pods and permits the free passage of floss and seeds. If desired, other suitable forms of vibratory mechanisms may be used in place of that described.

It has been found that the freed floss and seeds have a tendency to collect on the top of the grate 22 and around its periphery. To prevent this a number of small air streams are introduced from the sides of the duct 28 and immediately above the grate 22. These air streams, in the embodiment illustrated, are fed from the blower 26. Between the blower 26 and chamber 16 a union 44 is placed. An air scoop 46 diverts a small portion of the air from the stream created by the blower 26, which stream is conducted through pipe 48 to a conduit 50 which encircles the duct 28. A plurality of small holes 52 in the wall of duct 28 permits passage of air in small streams from the conduit 50 to the duct 28. These air streams enter duct 28 at substantially right angles to the course of the main air stream to dislodge any accumulation of floss and seeds. It is not necessary that these small air streams enter at right angles to the main air stream, and in some installations other angles may be more desirable.

After the floss and seeds have been completely freed from the pods they pass through the duct 28 to the thresher 54. When the blower 26 has blown the floss and seeds through the thresher, it must be turned off to permit removal of the empty pods. To accomplish this removal, the valve 24 is moved so that the large opening 56 registers with the opening 32; the chute 58 is moved to the dotted line position (Fig. 2) and the pods slip through the opening 56 and slide down the chute 58 to a waiting cart 60 in which they are gathered. The upper portion 59 of the chute forms a part of the wall of the blower pipe and when the chute 58 is moved to the dotted line position an opening 61 appears in the blower pipe. The pods are collected and saved as they have many commercial uses. The chamber 16 is now clean and ready for another batch of pods. In order to determine when the pods have been freed of their contents of floss and seeds, a window 60 may be provided in duct 28 so that the operator may determine at what time the agitation operation may be discontinued.

The freed floss and seeds are carried through the duct 28 under the force of the air stream from blower 26. Duct 28 is connected to a long cloth tube 62 which leads to a second chamber 64 through a duct 66. As the floss and seeds pass through the tube 62 under the force of the air pressure created by blower 26 they are subjected to the action of a plurality of beaters 68. The beaters 68 collapse the tube 62 and its contents and sufficiently agitate and work the floss and seeds against each other and against the wall of the tube 62 so that the seeds are gradually freed from the floss; the air pressure from the blower 26 also tends to keep the tube in its uncollapsed condition. This is a delicate operation as any beating of the floss and seeds in which the beaters impinge directly on the floss will crush, break, and destroy the delicate milkweed floss fibers. The floss fibers are springy and elastic, but if they are subjected to a direct mechanical threshing or beating, the bending and shearing stresses to which the floss is thus subjected substantially destroys the fibers.

The beaters 68 are driven by the motor 70 through a gear reduction box 72. As shown in one form of the invention, the beaters 68 are of the rotary type and each of those illustrated has four beating rollers 74 (Fig. 4). Two spaced apart sets of four equally spaced arms 76 provide journaling means for the rollers 74. The arms 76 are mounted in hubs 78 which are keyed to shaft 80. The shafts 80 are carried in suitable bearings 82 mounted in the standards 84. Two long shafts 86 are driven from the gear box 72. At spaced intervals on shaft 86 are keyed or formed worms 88 which are in constant mesh with worm gears 90. Each worm gear 90 is keyed to a shaft 80. The worm drives are so arranged that adjacent beaters 68 are driven in opposite directions to permit spacing the beaters 68 closer together.

Rollers 74 do the actual beating instead of flat blades to minimize the wear on the cloth tube 62 and to prevent bunching of the tube 62. Even with this precaution the tube 62 will show signs of wear and it may be desirable to replace it. The tube 62 is fastened to conduits 28 and 66 by removable fasteners 92 of any standard type. Therefore, in order to replace tube 62, all the operator needs to do is release the fasteners 92, take out the tube 62 and attach another tube; the fasteners 92 are then replaced.

In the chamber 64 the floss and seeds are gently agitated by an air stream created by the blower 94. This air stream is strong enough to carry away the floss, but the seeds fall from the center of the air stream to its sides and then fall down the sloping walls of chamber 64 which may also have an inverted conical shape. Chamber 64 is provided with an annular opening 96 at its bottom formed around the blower pipe 98. The separated seeds slide down the sloping walls of chamber 64 through the opening 96, through the vertical duct 97 and finally down the chute 102 into a suitable cart 104 or other receiving means. In this way the seeds are saved for further propagation of the milkweed plant or for the recovery of valuable oils.

The floss is blown out the top of chamber 64 after being separated from the seeds by the differential air flotation step just decribed. A grating 106 placed across the top of chamber 64 breaks up any large matting or collection of floss which might carry unseparated seeds from chamber 64. By taking steps to be sure that no single large accumulation of floss can pass from the chamber 64, it is possible to prevent any seeds being carried out accidentally.

The air-borne floss is blown from the chamber through duct 108 into suitable collecting bags 110. I prefer to have the collecting bag in a housing 112 equipped with a fine screen 114. A door 116 is provided in the housing 112 to permit the operator to remove and replace the bag 110 when it has been filled with floss.

Referring now to Fig. 1 a general description of the operation of my milkweed gin will be given. Pre-dried pods are collected in the storeroom 10 from which the large hopper 12 is filled. When the operator wishes to charge the gin with pods, he measures out a certain quantity in the feed hopper 18. The pods are fed into the agitation chamber 16 through gate 20. Blower 26 is turned on, the proper setting of valve 24 is made, and the pods are violently agitated until completely freed of floss and seeds. The floss and seeds are blown through the duct 28 into the cloth tube 62. As they pass through the tube 62 under the air pressure from the blower 26, they are subjected to the action of the beaters 68. The action thus administered agitates the floss fibers and seeds against each other and against the wall of the tube so that the floss and seeds are completly separated.

The floss and seeds are exhausted into the chamber 64 in which the floss is borne off by a differential air flotation, and the air-borne floss is collected in the cloth bag 110. The heavier seeds fall down through the chute 102. While the air-flotation separation is being carried on, chamber 16 may be cleaned out. The chute 58 is tilted into the dotted line position (Fig. 2) and the valve 24 moved to register the opening 56 with opening 32. The empty pods then fall through the opening in the bottom of the agitation chamber 16 down chute 58 and into the cart 60.

The floss gathered in the bag 110 is perfectly freed of seeds and other impurities. The smooth, hollow, elastic fibers retain all of their valuable characteristics, and are not bent, broken or damaged so as to impair the value and usefulness of the floss.

In Fig. 5 I have shown an alternative form of separation chamber 64 and collection means. The floss is separated by an air stream created by a suction or exhaust type blower 120. The air is sucked through chamber 64 from the duct 66 or a screened opening 121 and the floss separated from the seeds by differential air flotation as before, the seeds dropping down the chute 102. The housing 122 in which the bag 110 is placed must be air-tight, and the door 124 sealed against leaks. This principle of operation in this embodiment of my invention is the same as that of the apparatus described in connection with Fig. 1.

In Fig. 6 I have shown another method of arranging the threshing unit, only a fragmentary section of tube 62 being shown. The tube 62 is compressed and expanded under the action of rollers 130 which are given a vertical motion by the cams 132. Cams 132 are keyed to shafts 134 which may be driven in a manner similar to the shafts 80. Rollers 130 are journaled in the ends of actuating rods 136 which have cam follower rollers 138 at their opposite extremities. The rods are guided in sleeves 140 and each rod 136 is provided with a shoulder 142. The sleeves 140 are provided with offset bearing portions 144 at each end, and a spring 146 is held between the portion 144 and the shoulder 142 to maintain the cam followers 138 on the cam surface.

The operation of the beaters may be staggered so that no two adjacent beaters will completely compress the tube 62 at the same time. In the apparatus shown in Fig. 6 the beaters may be spaced closer together than the rotory beaters 68 and the length of tube 62 may be shortened or more beaters used for the same length of tube.

In Fig. 7 the tube 62 is compressed against a rigid backing 150 by beaters 152 which may be driven as shown in either Fig. 1 or Fig. 6. The backing 150 may be provided with offset portions 154 to cooperate with the beaters 152. The principle of operation of the apparatus shown in Figs. 6 and 7 is identical with that shown in Fig. 1.

In Figs. 8 to 11 I have shown a further modification of my invention in which a pair of conveyor belts 160, 162 are substituted for the tube 62. The belts 160, 162 run between side plates 164 to prevent the escape of floss and seeds to the sides. The duct 28 is welded or riveted to the side plates 164 at 166; duct 66 is welded or riveted to the side plates 164 at 168.

The conveyor belts 160, 162 are driven through sprockets 170 and drive chains 172 by the same motor 70 that drives the shafts 86. The spockets 170 drive pulleys 174 and both are mounted on shafts 176. Idler pulleys 178 mounted on shafts 180 are provided at the opposite end of the conveyor system. To aid in maintaining the conveyor belts in flat condition perpendicular to the direction of travel each set of pulleys is separated by a drum 182. Each drum 182 is provided with a flange 184 to which pulleys 178 may be bolted or riveted as at 188 (Fig. 10). It is possible to fit the conveyor belts with thin slots running across the width of each belt also to prevent buckling of the belt across its width.

Each conveyor belt 160, 162 is fitted with cords 190 at the outside edges to act as a seat in cooperation with the side plates 164. Cords 190 also provide the driving means and pass over the pulleys 178 (Fig. 10). The side plates 164 have a turned in portion 192 at top and bottom to limit the vertical movement of the belts. It is not important that this assembly be air-tight because the floss and seeds are transmitted through the thresher by the belts and not by the air pressure supplied by the blower 26.

The beaters 68 in this form of the invention are substantially similar to those in the form illustrated in Fig. 1. They are driven by the shafts 86 and worm and gear drives 88, 90. Each beater is provided with the rollers 74 which act on the reverse faces of the belts 160, 162. As the conveyor belts 160, 162 carry the floss and seeds they are beaten and the space confined by the belts is compressed and expanded under action of the beaters 68. The floss that is delivered to the chamber 64 is thus freed of seeds. The beaters 68 are designed to fit between the side plates 164.

Figs. 8 and 9 illustrate a modified form of air-flotation chamber 194 which is similar to the air flotation chamber 64. It is shown in the form of an inverted cone and is covered at the top with a grate 196. A blower 198 blows an air stream into chamber 194 through pipe 199. The seeds drop from chamber 194 through the duct 200 surrounding pipe 199 down the chute 202 and into the cart 204.

At the top of chamber 194 and around its outer periphery there are formed a number of blades 206 which resemble a turbine. Completely enclosing the blades 206 is a duct 208 which may be welded to the chamber 194. This duct is connected to blower 198 through the pipe 210. When the blower 198 is in operation a portion of the air stream will be diverted through the pipe 210 into the duct 208. The blades 206 direct this secondary air stream into the chamber 194 on a plane perpendicular to the main air stream. The two air streams form a current in which the floss and seeds are given a circular motion. The seeds being heavier than the floss are carried to the outside of the circular current and drop out of the main current and down the sloping walls. The relatively light floss gravitates to the center of the circular stream and into the path of the vertical air current. The floss is borne off through the duct 212 and may be collected in the bag 110 as has been heretofore described.

It is apparent that the disclosures made herein may be subjected to certain modifications which do not depart from the scope and spirit of the invention. For instance, it is possible that the upper conveyor belt 162 (Fig. 8) be replaced with a single plate such as that disclosed in Fig. 7. The plate would cooperate with or be made integral with the side plates 164 to form a deep channel section. The floss and seeds would be carried by the belt 160 through the channel and the beaters 68 would thresh the floss and seeds against the top of the channel section.

The apparatus of the present invention is particularly adapted to commercial usage in mass production. Fig. 12 diagrammatically illustrates a typical mass production layout. As is noted from the foregoing description of the apparatus, there are only two operations which are not continuous. These are the steps of the pod separation and the floss collection. The other steps are adapted to be continuous.

As shown in Fig. 12, a single large hopper 214 may supply the pod separators 218 through control gates 216. The pod separators 218 discharge the freed floss and seeds through a conduit union and then into the thresher 220. It is readily seen that any one or more of the pod separators 218 may be cut out of the mass operation by closing its gate 222. The air-borne floss is taken from the separator 224 to the collectors 226. Any one of the collectors 226 may be cut out of the operation by closing its control gate 228 so that the collection bags may be replaced.

From the foregoing description it will be readily apparent to those skilled in the art that changes and modifications may be made without departing from the spirit and scope of my invention. I, therefore, wish to be limited only by the claims. What I claim as new and desire to secure by United States Letters Patent is:

1. In an apparatus for separating the pods, seeds, and floss of the milkweed plant, an agitation chamber, a second chamber, threshing means disposed between said agitation chamber and said second chamber, means connecting said agitation chamber, said threshing means and said second chamber, and moving air means adapted to separate the floss and seeds from the pods in said agitation chamber and for carrying them through said threshing means to said second chamber.

2. In an apparatus for separating the pods, seeds, and floss of the milkweed plant, an agitation chamber, threshing means, duct means connecting said agitation chamber to said threshing means, means for introducing an air stream into said agitation chamber to carry the seeds and floss through said threshing means, a second chamber connected to said threshing means, moving air means in said second chamber adapted to separate the floss and seeds, and means for collecting the air-borne floss.

3. In an apparatus for separating the pods, seeds, and floss of the milkweed plant, an agitation chamber, a second chamber, threshing means disposed between said agitation chamber and said second chamber and operatively connected thereto, means to introduce an air stream into said agitation chamber to separate the floss and seeds from the pods and to carry the floss and seeds through the threshing means to exhaust them into said second chamber, means for collecting air-borne floss, and moving air means adapted to carry the air-borne floss from said second chamber to the collection means.

4. In an apparatus for separating the pods, seeds, and floss of the milkweed plant, an agitation chamber, a second chamber, a collapsible tube disposed between said agitation chamber and second chamber and connected to both said chambers, means disposed adjacent said tube to collapse it intermittently, means for introducing a stream of air into said agitation chamber to carry buoyant material from said agitation chamber through said tube and into said second chamber.

5. In an apparatus for the separation of the pods, seeds, and floss of the milkweed plant, an agitation chamber, a second chamber, a collapsible tube disposed between said agitation chamber and said second chamber and connected at its ends to both said chambers, beaters disposed adjacent said tube to collapse it intermittently, means to agitate the pods and seeds in said agitation chamber and to carry the floss and seeds through said tube to said second chamber, collection means, means connecting said second chamber and said collection means, and means connected to said second chamber and arranged to pass an air stream therethrough, thereby to separate the floss from the seeds and to carry the floss from said second chamber to said collection means.

6. In apparatus for the separation of the pods, seeds, and floss of the milkweed plant, an agitation chamber in which the pods are agitated to cause them to burst open and discharge the floss and seeds, a grate at the top of said chamber, means for vibrating said grate, an air flotation chamber, threshing means disposed between and connecting said agitation and air flotation chambers, said threshing means including a collapsible tube through which floss and seeds are adapted to be passed, a plurality of beaters arranged adjacent said tube, means cooperatively associated with said beaters for collapsing said tube alternately at spaced points, means for introducing an air stream into said agitation chamber beneath said grate and for directing said air through said tube to tend to maintain the tube in uncollapsed condition and to effect the flow of floss and seeds into said flotation chamber, means connected to said last named means for passing a plurality of small air streams into said agitation chamber perpendicular to said first mentioned air stream and immediately above said grate, whereby said plurality of air streams and the vibration of the grate prevent the collection of floss and seeds on said grate, means for passing a stream of air through said flotation chamber for bearing off the floss by differential air flotation in said chamber, and means adjacent the bottom of said flotation chamber enabling removal of seeds from said chamber.

BORIS BERKMAN.

REFERENCES CITED

The following references are of record in the file of this patent:

UNITED STATES PATENTS

| Number | Name | Date |
|---|---|---|
| 54,625 | Town | May 8, 1866 |
| 233,847 | Groom | Nov. 2, 1880 |
| 577,115 | Schmelzinger | Feb. 16, 1897 |
| 1,071,022 | Berger | Aug. 26, 1913 |
| 2,090,955 | Taylor | Aug. 24, 1937 |
| 2,233,156 | Berkman | Feb. 25, 1941 |
| 2,244,203 | Kern | June 3, 1941 |
| 2,259,830 | Osborne | Oct. 21, 1941 |